United States Patent [19]

Neyret

[11] 4,420,659
[45] Dec. 13, 1983

[54] BI-STABLE MECHANISM AND ANTI-THEFT DEVICE FOR A MOTOR VEHICLE COMPRISING SUCH MECHANISM

[75] Inventor: Guy Neyret, Oullins, France

[73] Assignee: Sodex Magister, Societe d'Exploitation des Brevets. Neiman, Croissy, France

[21] Appl. No.: 363,206

[22] Filed: Mar. 29, 1982

Related U.S. Application Data

[62] Division of Ser. No. 212,774, Dec. 4, 1980, Pat. No. 4,350,852.

[30] Foreign Application Priority Data

Dec. 7, 1979 [FR] France .................................. 79 30061

[51] Int. Cl.³ .............................................. H01H 5/04
[52] U.S. Cl. ........................................ 200/67 A; 74/97
[58] Field of Search ..................... 200/6 R, 6 C, 67 R, 200/67 A, 153 H; 74/97, 100 R

[56] References Cited

U.S. PATENT DOCUMENTS

| 422,147 | 2/1890 | Parker et al. | 200/67 R |
| 690,405 | 1/1902 | Darlington | 200/6 C |
| 2,548,103 | 4/1951 | French | 200/67 A |
| 3,457,383 | 7/1969 | Roberts et al. | 200/67 A |
| 3,519,776 | 7/1970 | Slater | 200/67 A |
| 4,117,280 | 9/1978 | Feaster | 200/67 A |

FOREIGN PATENT DOCUMENTS 600810 12/1959 Italy .................................. 200/6 R Primary Examiner—John W. Sheppard
Attorney, Agent, or Firm—James Creighton Wray

[57] ABSTRACT

The invention relates to a bi-stable (toggle) mechanism for a vehicle anti-theft device comprising a lever 20 pivotally mounted by a shaft 21, the said lever being subject to the action of a spring 22 and movable from one stable position through a center position to a second stable position.

In the mechanism according to the invention, the said spring 22 consists of a hairpin type spring of which one end 26 is connected to one end of the said lever 20 and the other end 23 mounted so as to pivot at a fixed point 24. The distance between the ends 23,26 of the spring 22 when the lever 20 is in either stable position is greater than the distance between the ends when the lever 20 is at its center position whereby the spring becomes more compressed as the lever approaches the center position where the lever is unstable. The distance between the two ends of the hairpin spring may be less than half that length of the lever which is included between its shaft 21 and the point 24 at which the hairpin spring is located.

4 Claims, 4 Drawing Figures

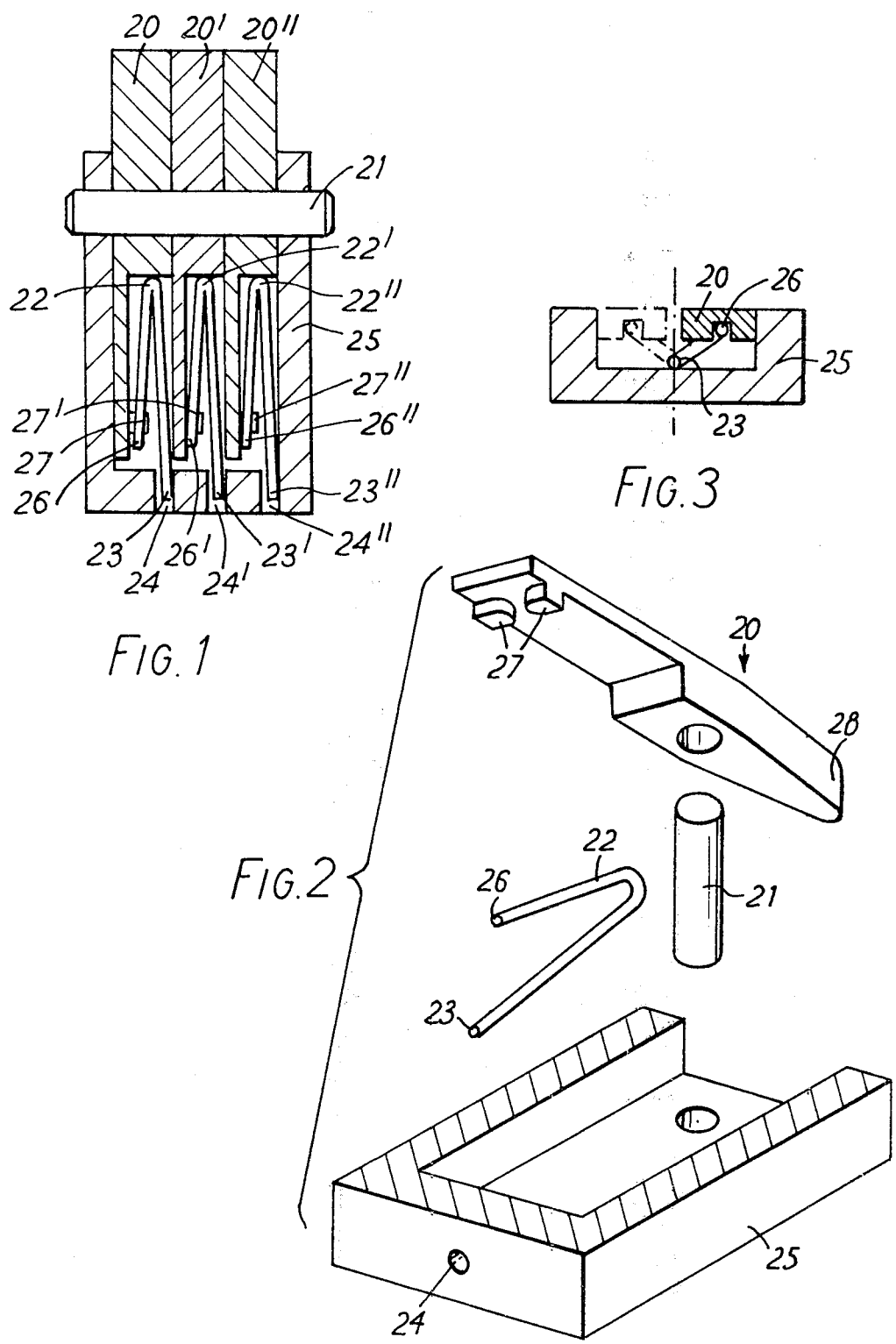

BI-STABLE MECHANISM AND ANTI-THEFT DEVICE FOR A MOTOR VEHICLE COMPRISING SUCH MECHANISM

This application is a divisional application from application Ser. No. 212,774 (now U.S. Pat. No. 4,350,852) filed Dec. 4th, 1980 with priority Dec. 7th, 1979.

BACKGROUND TO THE INVENTION

The invention concerns a bi-stable mechanism and its application to anti-theft device for motor vehicles.

There is considerable need for an extremely simple, economical and robust mechanical device capable of ensuring, in a simple and reliable manner, two stable positions. The purpose of the present invention is to provide such a device, particularluy for the car lock industry.

STATEMENT OF INVENTION

According to the invention we provide a bi-stable mechanism comprising:
 (a) a housing,
 (b) a lever pivotally mounted between its ends in said housing about an axis and movable between first and second stable positions, and
 (c) a spring for urging said lever towards one of said stable positions according to selection, said spring being of a hairpin type spring of which one end is connected to one end of the said lever and the other end mounted so as to pivot at a fixed point, said spring being in the plane of the lever perpendicular to the said axis, the distance between the ends of the spring when the lever is in either stable position is greater than the distance between the point of location of the spring and the point of engagement of the spring end with the lever end when the lever is at its centre position whereby the spring becomes more compressed as the lever approaches the centre position where the lever is unstable.

The new bi-stable (toggle) mechanism to which the invention relates, which uses a hairpin spring, occupies very little space and at the same time provides considerable amplitude of movement, owing to the small distance between the two ends of the hairpin spring.

BRIEF DESCRIPTION OF THE DRAWINGS

The invention will be clearly understood from a perusal of the following description, by reference to the attached drawing, in which:

FIG. 1 is a schematic section through a mechanism made in accordance with the invention.

FIG. 2 is an exploded schematic view, in perspective and partially in section, of a part of the device shown in FIG. 1.

FIG. 3 is a cross-section of the assembly shown in FIG. 2.

Figure 4:
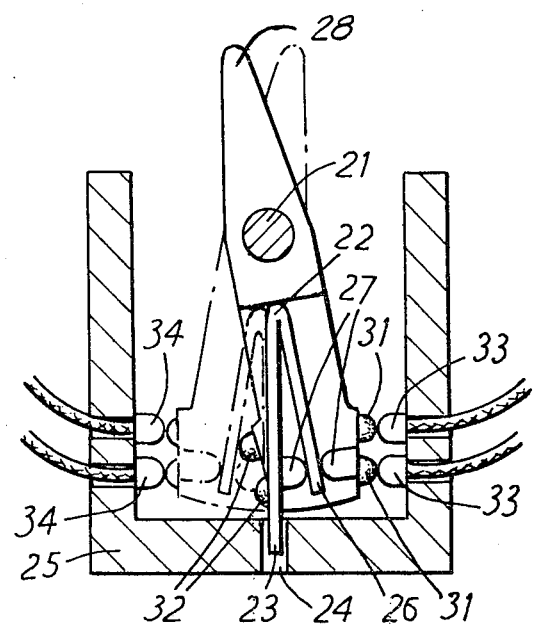
FIG. 4 is a plan view, partly in section, of an electric switch using a bistable device made in accordance with the invention.

Three levers 20,20',20", are mounted adjacent to one another and in such a way as to rotate about one common shaft 21 and are subjected to the action of hairpin springs 22,22',22", respectively. The springs have ends, 23,23',23", accommodated in holes 24,24', 24", respectively, of a box 25. The other end 26,26', 26", in a recess of each spring is held between two bosses 27,27', 27", as the case may be, of the corresponding lever, in order to be integral therewith. The passage from one of the two stable positions is effected by action on that end 28 of the lever 20 which is opposite to the bosses 27 (by cam 2 as described in the aforesaid parent patent).

The distance between the ends 23,26 of the spring 22 when the lever 20 is in either stable position is greater than the distance between the ends when the lever 20 is at its center position whereby the spring becomes more compressed as the lever approaoces the centre position where the lever is unstable. The distance between the two ends of the hairpin spring may be less than half that length of the lever which is included between its shaft 21 and the point 24 at which the hairpin spring is located.

In the example shown in FIG. 4, in which the same reference number as before is retained for any component already appearing in FIGS. 1–3, the lever 20 bears two sets of movable contacts 31 and 32. In a first stable position, shown in full lines, the contacts 31 interact with fixed contacts 33 of the box 25. In the second stable position, shown in dotted lines, the contacts 32 interact with a second set of fixed contacts 34 of the box 25. The contactor thus formed can be actuated by means of a cam acting on the end 28 of the lever 20. I claim:

1. A bi-stable mechanism comprising:
 (a) a housing having one wall provided with a hole therein and other walls providing abutments,
 (b) a lever pivotally mounted between its ends in said housing about an axis and movable between first and second stable positions determined by engagement of the lever with said abutments, said lever having a recess therein formed by a reduced thickness of the lever on one side of said axis, and
 (c) a spring for urging said lever towards one of said stable positions according to selection, said spring being of a hairpin type spring of which the end of the first leg is engaged in said hole so as to be pivotable therein about the axis of said first leg and the end of the second leg is connected with the lever, said spring being located in said recess, the arrangement being such that movement of the lever pivots the spring about the pivotal axis of said first leg, the distance between the said ends of the legs of the spring when the lever is in either stable position is greater than the distance between said end of the first leg of the spring and the point of engagement of the end of the other leg of the spring with the lever when the lever is at its center position whereby the spring becomes more compressed as the lever approaches the center position where the lever is unstable and wherein the first leg is perpendicular to the axis of said lever.

2. A mechanism according to claim 1, wherein said positions are limited by engagement of said lever with opposite sides of a recess in said housing.

3. A mechanism according to claim 1, wherein the lever bears movable electrical contacts interacting with different fixed electrical contacts, according to the particular stable position occupied by the said lever.

4. A mechanism as claimed in claim 1 having a plurality of said levers on a common pivot, each lever having said spring in a recess in the lever.

* * * * *